United States Patent
Phillips et al.

(10) Patent No.: US 8,016,712 B2
(45) Date of Patent: Sep. 13, 2011

(54) EIGHT SPEED AUTOMATIC TRANSMISSION

(75) Inventors: Andrew W. Phillips, Saline, MI (US);
James M. Hart, Belleville, MI (US);
Scott H. Wittkopp, Ypsilanti, MI (US);
Clinton E. Carey, Monroe, MI (US);
Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 735 days.

(21) Appl. No.: 12/045,319

(22) Filed: Mar. 10, 2008

(65) Prior Publication Data
US 2008/0242489 A1     Oct. 2, 2008

Related U.S. Application Data

(60) Provisional application No. 60/909,116, filed on Mar. 30, 2007.

(51) Int. Cl.
*F16H 3/44* (2006.01)

(52) U.S. Cl. ........ 475/282; 475/311; 475/313; 475/317; 475/319

(58) Field of Classification Search .......... 475/282–293, 475/303, 311–313, 317–319, 323–325
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 3/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,128,683 B2 * | 10/2006 | Oguri et al. | 475/276 |
| 7,163,484 B2 | 1/2007 | Klemen | |
| 7,285,069 B2 * | 10/2007 | Klemen | 475/275 |
| 7,527,576 B2 * | 5/2009 | Kamm et al. | 475/284 |
| 7,645,207 B2 * | 1/2010 | Kamm et al. | 475/275 |
| 7,645,208 B2 * | 1/2010 | Kamm et al. | 475/275 |
| 7,699,741 B2 * | 4/2010 | Hart et al. | 475/271 |
| 7,699,743 B2 * | 4/2010 | Diosi et al. | 475/277 |
| 7,753,819 B2 * | 7/2010 | Phillips et al. | 475/275 |
| 7,785,225 B2 * | 8/2010 | Phillips et al. | 475/277 |
| 7,789,791 B2 * | 9/2010 | Phillips et al. | 475/275 |
| 7,789,792 B2 * | 9/2010 | Kamm et al. | 475/330 |
| 7,794,353 B2 * | 9/2010 | Wittkopp et al. | 475/276 |
| 7,815,541 B2 * | 10/2010 | Phillips et al. | 475/275 |
| 2005/0090362 A1 | 4/2005 | Abe et al. | |
| 2006/0270513 A1 | 11/2006 | Klemen | |
| 2006/0270516 A1 | 11/2006 | Klemen | |

* cited by examiner

*Primary Examiner* — Tisha D Lewis

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

24 Claims, 3 Drawing Sheets

| GEAR STATE | GEAR RATIO | RATIO STEP | TORQUE TRANSMITTING DEVICES ||||| 
|---|---|---|---|---|---|---|---|
| | | | 34 | 32 | 28 | 26 | 30 |
| REV | -2.358 | | X | X | | | X |
| N | | -0.51 | O | O | | | |
| 1ST | 4.579 | | X | X | | X | |
| 2ND | 2.579 | 1.78 | X | X | X | | |
| 3RD | 1.526 | 1.69 | | X | X | X | |
| 4TH | 1.345 | 1.13 | | X | X | | X |
| 5TH | 1.169 | 1.15 | | X | | X | X |
| 6TH | 1.000 | 1.17 | | | X | X | X |
| 7TH | 0.759 | 1.32 | X | | | X | X |
| 8TH | 0.563 | 1.35 | X | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES | | | | |
|---|---|---|---|---|---|---|---|
| | | | 134 | 132 | 128 | 126 | 130 |
| REV | -2.400 | | X | X | | | X |
| N | | -0.52 | O | O | | | |
| 1ST | 4.600 | | X | X | | X | |
| 2ND | 3.067 | 1.50 | X | X | X | | |
| 3RD | 2.128 | 1.44 | | X | X | X | |
| 4TH | 1.700 | 1.25 | | X | X | | X |
| 5TH | 1.327 | 1.28 | | X | | X | X |
| 6TH | 1.000 | 1.33 | | | X | X | X |
| 7TH | 0.820 | 1.22 | X | | | X | X |
| 8TH | 0.667 | 1.23 | X | | X | | X |

X = ON - ENGAGED CARRYING TORQUE
O = ON - ENGAGED NOT CARRYING TORQUE

EIGHT SPEED AUTOMATIC TRANSMISSION

CROSS-REFERENCE TO RELATED APPLICATIONS

This application claims the benefit of U.S. Provisional Application No. 60/909,116 filed on Mar. 30, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

In an aspect of the present invention a transmission is provided. The transmission has an input member, an output member, first, second, third and fourth planetary gear sets. The planetary gear sets each having first, second and third members. A first interconnecting member continuously interconnects the first member of the first planetary gear set with the first member of the second planetary gear set. A second interconnecting member continuously interconnects the third member of the first planetary gear set with the third member of the third planetary gear set. A third interconnecting member continuously interconnects the second member of the second planetary gear set with the second member of the third planetary gear set. A fourth interconnecting member continuously interconnects the second member of the third planetary gear set with the second member of the fourth planetary gear set. Five torque transmitting devices are selectively engageable to interconnect one of the first members, second members, and third members with at least one other of the first members, second members, third members, and the stationary member. The torque transmitting devices are selectively engageable in combinations of at least three to establish at least eight forward speed ratios and at least one reverse speed ratio between the input member and the output member.

In another aspect of the present invention, a first of the five torque transmitting devices is selectively engageable to interconnect at least one of the third member of the second planetary gear set and the input member with at least one of the third member of the first planetary gear set and the third member of the third planetary gear set.

In yet another aspect of the present invention, a second of the five torque transmitting devices is selectively engageable to interconnect at least one of the first member of the first planetary gear set and the first member of the second planetary gear set with least one of the third member of the first planetary gear set and the third member of the third planetary gear set.

In yet another aspect of the present invention, a third of the five torque transmitting devices is selectively engageable to interconnect the second member of the first planetary gear set with at least one of the third member of the fourth planetary gear set and the output member In yet another aspect of the present invention, a fourth of the five torque transmitting devices is selectively engageable to interconnect the first member of the third planetary gear with a stationary member.

In yet another aspect of the present invention, a fifth of the five torque transmitting devices is selectively engageable to interconnect the first member of the fourth planetary gear set with the stationary member.

In yet another aspect of the present invention, the first members of the first, second and fourth planetary gear sets and the third member of the third planetary gear set are sun gears, the second members of the first and third planetary gear sets and third members of the second and fourth planetary gear sets are carrier members, and the third member of the first planetary gear set and the second member of the second and fourth planetary gear sets and the first member of the third planetary gear set are ring gears.

In yet another aspect of the present invention, the first members of the first, second and fourth planetary gear sets and the third member of the third planetary gear set are sun gears, the second members of the first, second and third planetary gear sets and third member of the fourth planetary gear set are carrier members, and the third members of the first and second planetary gear sets and the second member of the fourth planetary gear set and the first member of the third planetary gear set are ring gears.

In yet another aspect of the present invention, the stationary member is a transmission housing.

In still another aspect of the present invention, another embodiment of a transmission is provided. The transmission includes an input member, an output member, fourth planetary gear sets each having first, second and third members. The input member is continuously interconnected with second member of the first planetary gear set and the output member is continuously interconnected with the third member of the fourth planetary gear set. A first interconnecting member continuously interconnects the first member of the first planetary gear set with the first member of the second planetary gear set. A second interconnecting member continuously interconnects the third member of the first planetary gear set with the third member of the third planetary gear set. A third interconnecting member continuously interconnects the second member of the second planetary gear set with the second member of the third planetary gear set. A fourth interconnecting member continuously interconnects the second member of the third planetary gear set with the second member of the fourth planetary gear set. A first torque transmitting device is selectively engageable to interconnect at least one of the second member of the first planetary gear set and the input member with the first member of the fourth planetary gear set. A second torque transmitting device is selectively engageable to interconnect the third member of the third planetary gear set with the first member of the fourth planetary gear set. A third torque transmitting device is selectively engageable to interconnect the first member of the third planetary gear set with at least one of the third member of the fourth planetary gear set and the output member. A fourth torque transmitting device is selectively engageable to interconnect the third member of the second planetary gear with the stationary member. A fifth torque transmitting device selectively engageable to interconnect the first member of the second planetary gear set with the stationary member. The torque transmitting devices are selectively engageable in combinations of at least three to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to first component or element of a second planetary gear set. A third component or element of a first planetary gear set is permanently coupled to third component or element of a third planetary gear set. A second component or element of the second planetary gear set is permanently coupled to a second component or element of the third planetary gear set. A second component or element of a third planetary gear set is permanently coupled to a second component or element of a fourth planetary gear set.

Figure 1:
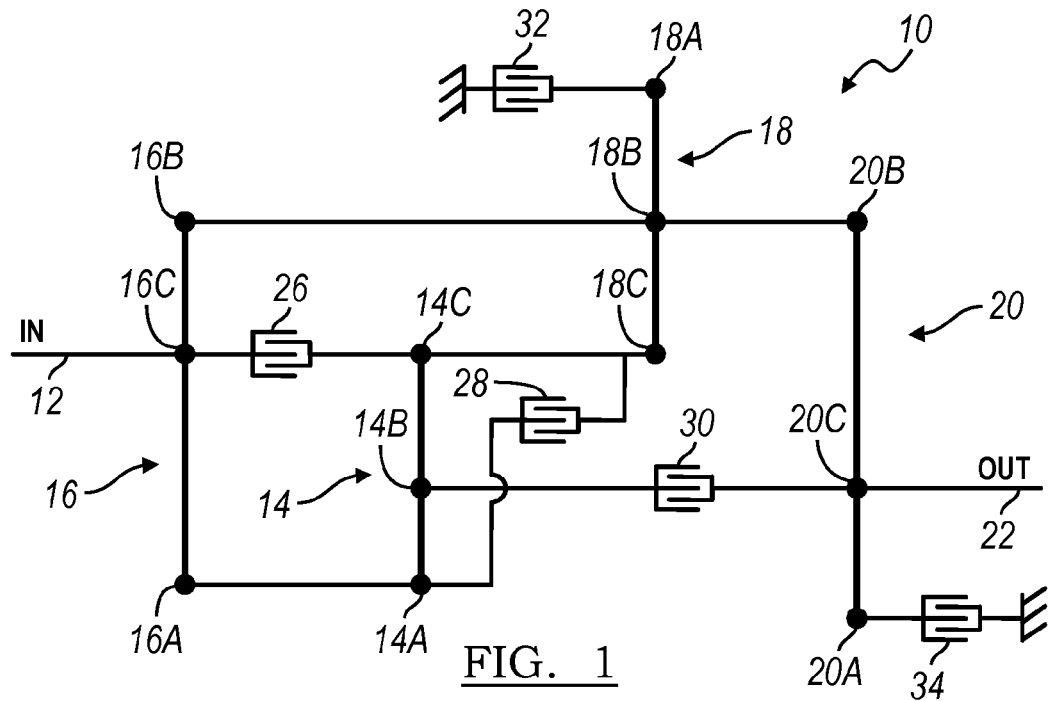
FIG. 1 is a lever diagram of a first embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratio and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose, and use of lever diagrams can be found in SAE paper 810102, "The Lever Analogy: A New Tool in Transmission Analysis" by Benford and Leising, which is hereby fully incorporated by reference.

The automatic transmission 10 includes an input shaft or member 12, an output shaft or member 22, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, and a fourth planetary gear set 20 having three nodes: a first node 20A, a second node 20B and a third node 20C. The first node 14A of the first planetary gear set 14 is coupled to the first node 16A of the second planetary gear set 16. The third node 14C of the first planetary gear set 14 is coupled to the third node 18C of the third planetary gear set 18. The second node 16B of the second planetary gear set 16 is coupled to the second node 18B of the third planetary gear set 18 and coupled to the second node 20B of the fourth planetary gear set 20.

The input shaft or member 12 is coupled to the third node 16C of the second planetary gear set 16. The output shaft or member 22 is coupled to the third node 20C of the fourth planetary gear set 20. A first clutch 26 selectively connects the third node 16C of the second planetary gear set 16 to the third node 14C of the first planetary gear set 14. A second clutch 28 selectively connects the first node 14A of the first planetary gear set 14 to the third node 14C of the first planetary gear set 14 and a third clutch 30 selectively connects the second node 14B of the first planetary gear set 14 to the third node 20C of the fourth planetary gear set 20. A first brake 32 selectively connects the first node 18A of the third planetary gear set 18 to ground and a second brake 34 selectively connects the first node 20A of the fourth planetary gear set 20 to ground.

Figure 2:
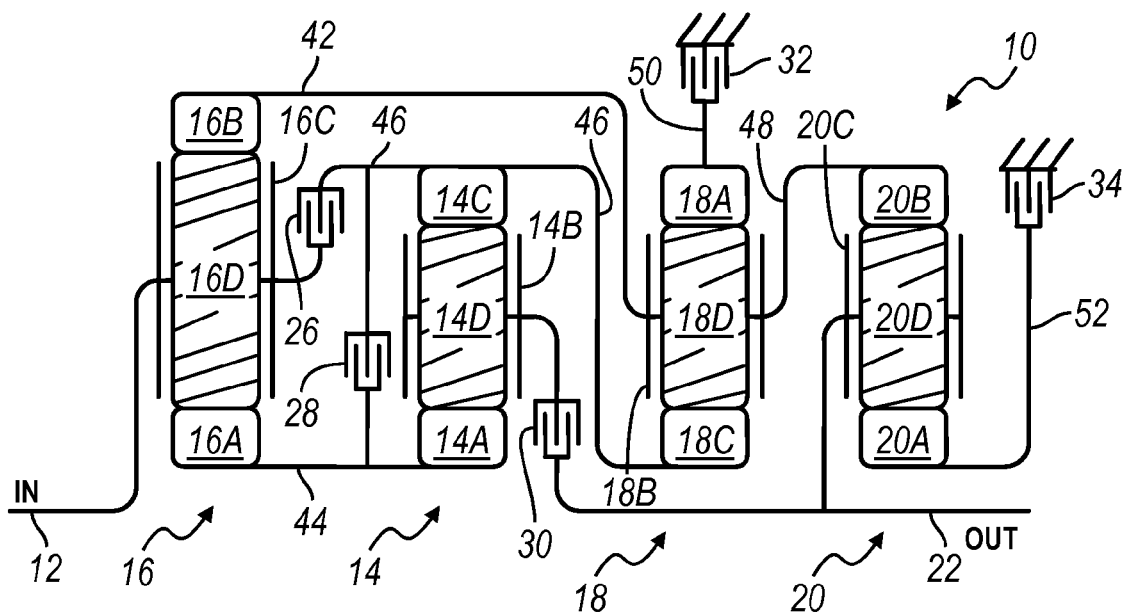
FIG. 2 is a diagrammatic view of the first embodiment of the eight speed automatic transmission according to the present invention.

Referring now to FIG. 2, a stick diagram presents a schematic layout of the first embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such a sun gears, ring gears, planet gears and planet gear carriers. More specifically, the first planetary gear set 14 includes a first sun gear 14A, a first ring gear 14C, and a first planet carrier 14B that includes a plurality of planet gears 14D rotatably disposed thereon. The second planetary gear set 16 includes a second sun gear 16A, a second ring gear 16B, and a second planet carrier 16C that includes a plurality of planet gears 16D rotatably disposed thereon. The third planetary gear set 18 includes a third sun gear 18C, a third ring gear 18A, and a third planet carrier 18B that includes a plurality of planet gears 18D rotatably disposed thereon. The fourth planetary gear set 20 includes a fourth sun gear 20A, a fourth ring gear 20B, and a fourth planet carrier 20C that includes a plurality of planet gears 20D rotatably disposed thereon.

The input shaft or member 12 is coupled to and directly drives the second planet carrier 16C. A first shaft or interconnecting member 42 couples the second ring gear 16B to the third planet carrier 18B. A second shaft or interconnecting member 44 couples the second sun gear 16A to the first sun gear 14A. A third shaft or interconnecting member 46 interconnects the first ring gear 14C with the third sun gear 18C. A fourth shaft or interconnecting member 48 couples the third planet carrier 18B to the fourth ring gear 20B. The first clutch 26 selectively couples the second planet carrier 16C to the third interconnecting member 46. The second clutch 28 selectively couples the first ring gear 14C to the first sun gear 14A and the third clutch 30 selectively couples the first planet carrier 14B to the output shaft or member 22. A fifth shaft or interconnecting member 50 couples the first brake 32 to the third ring gear 18A. The first brake 32 selectively couples the third ring gear 18A to ground. A sixth shaft or interconnecting member 52 couples the fourth sun gear 20A to the second brake 34. The second brake 34 selectively couples the fourth sun gear 20A to ground. The output shaft or member 22 is coupled to and driven by the fourth planet carrier 20C.

Figures 3, 4:
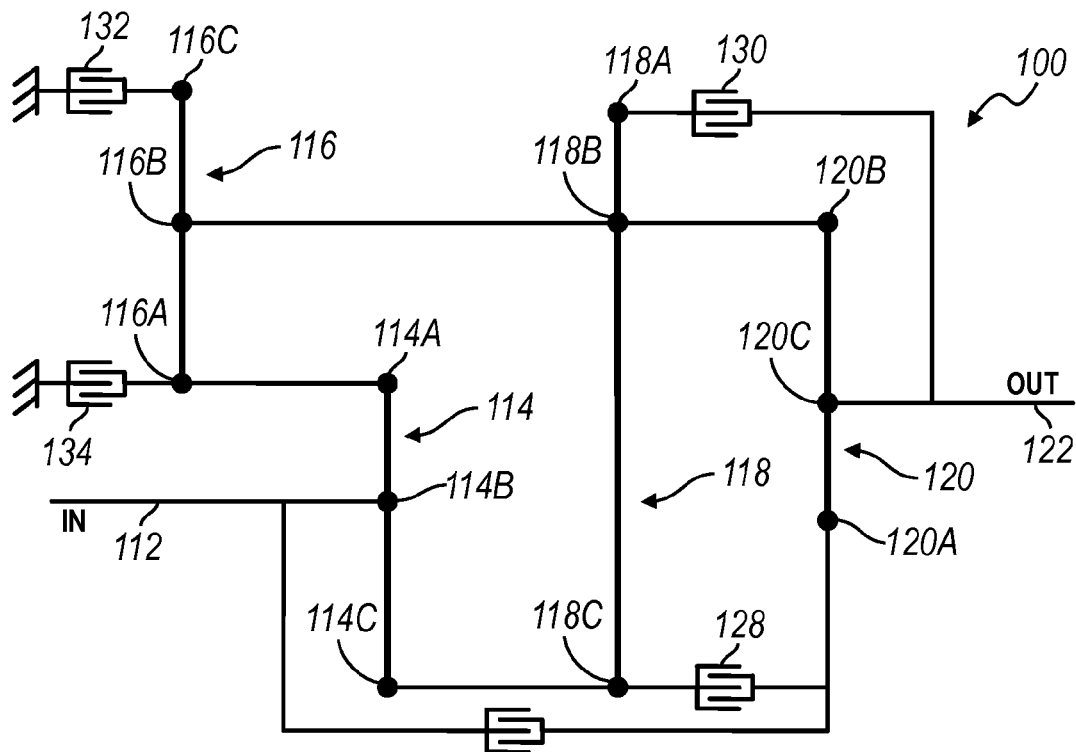
FIG. 3 is a truth table presenting the state of engagement of the various torque transmitting clutches and brakes in each of the available forward and reverse speeds or gear ratios of the automatic transmission illustrated in FIGS. 1 and 2.
FIG. 4 is a lever diagram of a second embodiment of an eight speed automatic transmission according to the present invention.

Referring now to FIGS. 2 and 3, the operation of the first embodiment of the eight speed automatic transmission 10 will be described. It will be appreciated that the automatic transmission 10 is capable of transmitting torque from the input shaft or member 12 to the output shaft or member 22 in eight forward speed or torque ratios and one reverse speed or torque ratio. Each forward and reverse speed or torque ratio is attained by engagement of one or more of the clutches or brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish ratios, three clutching elements are engaged for each gear state. The engaged clutches are represented by an "X" in each respective row. For example, to establish reverse gear, the first brake 32, the second brake 34, and the third clutch 30 are engaged or activated. The first brake 32 grounds the third ring gear 18A and the second brake 34 grounds the fourth sun gear 20A. The third clutch 30 connects the first planet carrier 14B to the fourth planet carrier 20C. Likewise, the eight forward ratios are achieved through different combinations of clutch engagement as per FIG. 3.

Turning now to FIG. 4, a lever diagram for a second embodiment of an eight speed automatic transmission 100 is illustrated. The automatic transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C, and an output shaft or member 122. The first node 114A of the first planetary gear set 114 is coupled to the first node 116A of the second planetary gear set 116. The third node 114C of the first planetary gear set 114 is coupled to the third node 118C of the third planetary gear set 118. The second node 116B of the second planetary gear set 116 is coupled to the second node 118B of the third planetary gear set 118 and coupled to the second node 120B of the fourth planetary gear set 120.

The input shaft or member 112 is coupled to the second node 114B of the first planetary gear set 114. The output shaft or member 122 is coupled to the third node 120C of the fourth planetary gear set 120. A first clutch 126 selectively connects the input shaft or member 112 to the first node 120A of the fourth planetary gear set 120. A second clutch 128 selectively connects the third node 118C of the third planetary gear set 118 to the first node 120A of the fourth planetary gear set 120. A third clutch 130 selectively connects the first node 118A of the third planetary gear set 118 to the output shaft or member 122. A first brake 132 selectively connects the third node 116C of the second planetary gear set 116 to ground and a second brake 134 selectively connects the first node 116A of the second planetary gear set 116 to ground.

Figures 5, 6:
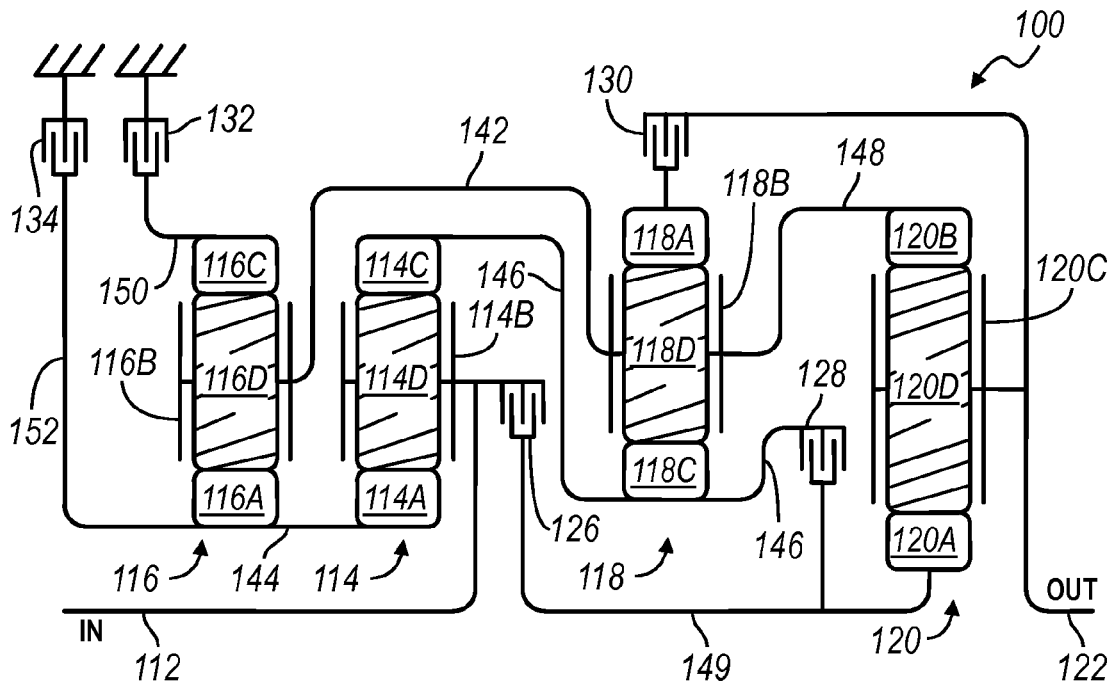
FIG. 5 is a diagrammatic view of the second embodiment of the eight speed automatic transmission according to the present invention.
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIG. 5, a stick diagram presents a schematic layout of the second embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such a sun gears, ring gears, planet gears and planet gear carriers. More specifically, the first planetary gear set 114 includes a first sun gear 114A, a first ring gear 114C, and a first planet carrier 114B that includes a plurality of planet gears 114D rotatably disposed thereon. The second planetary gear set 116 includes a second sun gear 116A, a second ring gear 116C, and a second planet carrier 116B that includes a plurality of planet gears 116D rotatably disposed thereon. The third planetary gear set 118 includes a third sun gear 118C, a third ring gear 118A, and a third planet carrier 118B that includes a plurality of planet gears 118D rotatably disposed thereon. The fourth planetary gear set 120 includes a fourth sun gear 120A, a fourth ring gear 120B, and a fourth planet carrier 120C that includes a plurality of planet gears 120D rotatably disposed thereon.

The input shaft or member 112 is coupled to and directly drives the first planet carrier 114B. A first shaft or interconnecting member 142 couples the second planet carrier gear 116B to the third planet carrier 118B. A second shaft or interconnecting member 144 couples the second sun gear 116A to the first sun gear 114A. A third shaft or interconnecting member 146 couples the first ring gear 114C to the third sun gear 118C. A fourth shaft or interconnecting member 148 couples the third planet carrier 118B to the fourth ring gear 120B. A fifth shaft or interconnecting member 149 couples the fourth sun gear 120A to the first clutch 126 and to the second clutch 128. The first clutch 126 selectively couples the first planet carrier 114B to the fourth sun gear 120A and the second clutch 128 selectively couples the third interconnecting member 146 and the third sun gear 118C to the fourth sun gear 120A. A sixth shaft or interconnecting member 150 couples the first brake 132 to the second ring gear 116C. The first brake 132 selectively couples the second ring gear 116C to ground. A seventh shaft or interconnecting member 152 couples the second sun gear 116A to the second brake 134. The second brake 134 selectively couples the second sun gear 116A to ground. The output shaft or member 122 is coupled to and driven by the fourth planet carrier 120C and is coupled to the third clutch 130. The third clutch 130 selectively couples the third ring gear 118A to the output shaft or member 122.

Referring now to FIGS. 5 and 6, the operation of the second embodiment of the eight speed automatic transmission 100 will be described. It will be appreciated that the automatic transmission 100 is capable of transmitting torque from the input shaft or member 112 to the output shaft or member 122 in eight forward speed or torque ratios and one reverse speed or torque ratio. Each forward and reverse speed or torque ratio is attained by engagement of one or more of the clutches or brakes as will be explained below. FIG. 6 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish ratios, three clutching elements are engaged for each gear state. The engaged clutches or brakes are represented by an "X" in each respective row. For example, to establish reverse gear, the first brake 132, the second brake 134, and the third clutch 130 are engaged or activated. The first brake 132 grounds the second ring gear 116C and the second brake 134 grounds the second sun gear 116A and the first sun gear 114A the third clutch 130 connects the third ring gear 118A to the output shaft or member 122. Likewise, the eight forward ratios are achieved through different combinations of clutch engagement as per FIG. 6.

It will be appreciated that the foregoing explanation of operation and gear states of the eight speed automatic transmission 100 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:
1. A transmission comprising:
an input member;
an output member;
first, second, third and fourth planetary gear sets each having first, second and third members;
a first interconnecting member continuously interconnecting the first member of the first planetary gear set with the first member of the second planetary gear set;
a second interconnecting member continuously interconnecting the third member of the first planetary gear set with the third member of the third planetary gear set;
a third interconnecting member continuously interconnecting the second member of the second planetary gear set with the second member of the third planetary gear set;
a fourth interconnecting member continuously interconnecting the second member of the third planetary gear set with the second member of the fourth planetary gear set; and
five torque transmitting devices each selectively engageable to interconnect at least one of the first members, second members, and third members with at least one other of the first members, second members, third members, and a stationary member; and
wherein the torque transmitting devices are selectively engageable in combinations of at least three to establish at least eight forward speed ratios and at least one reverse speed ratio between the input member and the output member.

2. The transmission of claim 1 wherein a first of the five torque transmitting devices is selectively engageable to interconnect at least one of the third member of the second planetary gear set and the input member with at least one of the third member of the first planetary gear set and the third member of the third planetary gear set.

3. The transmission of claim 2 wherein a second of the five torque transmitting devices is selectively engageable to interconnect at least one of the first member of the first planetary gear set and the first member of the second planetary gear set with least one of the third member of the first planetary gear set and the third member of the third planetary gear set.

4. The transmission of claim 3 wherein a third of the five torque transmitting devices is selectively engageable to interconnect the second member of the first planetary gear set with at least one of the third member of the fourth planetary gear set and the output member.

5. The transmission of claim 4 wherein a fourth of the five torque transmitting devices is selectively engageable to interconnect the first member of the third planetary gear with the stationary member.

6. The transmission of claim 5 wherein a fifth of the five torque transmitting devices is selectively engageable to interconnect the first member of the fourth planetary gear set with the stationary member.

7. The transmission of claim 1 wherein a first of the five torque transmitting devices is selectively engageable to interconnect at least one of the second member of the first planetary gear set and the input member with the first member of the fourth planetary gear set.

8. The transmission of claim 7 wherein a second of the five torque transmitting devices is selectively engageable to interconnect the third member of the third planetary gear set with the first member of the fourth planetary gear set.

9. The transmission of claim 8 wherein a third of the five torque transmitting devices is selectively engageable to interconnect the first member of the third planetary gear set with at least one of the third member of the fourth planetary gear set and the output member.

10. The transmission of claim 9 wherein a fourth of the five torque transmitting devices is selectively engageable to interconnect the third member of the second planetary gear with the stationary member.

11. The transmission of claim 10 wherein a fifth of the five torque transmitting devices is selectively engageable to interconnect the first member of the second planetary gear set with the stationary member.

12. The transmission of claim 1 wherein the first members of the first, second and fourth planetary gear sets and the third member of the third planetary gear set are sun gears, the second members of the first and third planetary gear sets and third members of the second and fourth planetary gear sets are carrier members, and the third member of the first planetary gear set and the second member of the second and fourth planetary gear sets and the first member of the third planetary gear set are ring gears.

13. The transmission of claim 1 wherein the first members of the first, second and fourth planetary gear sets and the third member of the third planetary gear set are sun gears, the second members of the first, second and third planetary gear sets and third member of the fourth planetary gear set are carrier members, and the third members of the first and second planetary gear sets and the second member of the fourth planetary gear set and the first member of the third planetary gear set are ring gears.

14. The transmission of claim 1 wherein the input member is continuously interconnected with the third member of the second planetary gear set and the output member is continuously interconnected with the third member of the fourth planetary gear set.

15. The transmission of claim 1 wherein the input member is continuously interconnected with the second member of the first planetary gear set and the output member is continuously interconnected with the third member of the fourth planetary gear set.

16. The transmission of claim 1 wherein the stationary member is a transmission housing.

17. A transmission comprising:
an input member;
an output member;
first, second, third and fourth planetary gear sets each having first, second and third members, wherein the input member is continuously interconnected with the third member of the second planetary gear set and the output member is continuously interconnected with the third member of the fourth planetary gear set;
a first interconnecting member continuously interconnecting the first member of the first planetary gear set with the first member of the second planetary gear set;
a second interconnecting member continuously interconnecting the third member of the first planetary gear set with the third member of the third planetary gear set;
a third interconnecting member continuously interconnecting the second member of the second planetary gear set with the second member of the third planetary gear set;
a fourth interconnecting member continuously interconnecting the second member of the third planetary gear set with the second member of the fourth planetary gear set;
a first torque transmitting device selectively engageable to interconnect at least one of the third member of the second planetary gear set and the input member with at least one of the third member of the first planetary gear set and the third member of the third planetary gear set;
a second torque transmitting device selectively engageable to interconnect at least one of the first member of the first planetary gear set and the first member of the second planetary gear set with least one of the third member of the first planetary gear set and the third member of the third planetary gear set;
a third torque transmitting device selectively engageable to interconnect the second member of the first planetary gear set with at least one of the third member of the fourth planetary gear set and the output member;
a fourth torque transmitting device selectively engageable to interconnect the first member of the third planetary gear set with a stationary member; and
a fifth torque transmitting device selectively engageable to interconnect the first member of the fourth planetary gear set with the stationary member, and
wherein the torque transmitting devices are selectively engageable in combinations of at least three to establish at least eight forward speed ratios and at least one reverse speed ratio between the input member and the output member.

18. The transmission of claim 17 wherein the first members of the first, second and fourth planetary gear sets and the third member of the third planetary gear set are sun gears, the second members of the first and third planetary gear sets and third members of the second and fourth planetary gear sets are carrier members, and the third member of the first planetary gear set and the second member of the second and fourth planetary gear sets and the first member of the third planetary gear set are ring gears.

19. The transmission of claim 17 wherein the stationary member is a transmission housing.

20. A transmission comprising:
an input member;
an output member;
first, second, third and fourth planetary gear sets each having first, second and third members, wherein the input member is continuously interconnected with second member of the first planetary gear set and the output member is continuously interconnected with the third member of the fourth planetary gear set;
a first interconnecting member continuously interconnecting the first member of the first planetary gear set with the first member of the second planetary gear set;
a second interconnecting member continuously interconnecting the third member of the first planetary gear set with the third member of the third planetary gear set;
a third interconnecting member continuously interconnecting the second member of the second planetary gear set with the second member of the third planetary gear set;
a fourth interconnecting member continuously interconnecting the second member of the third planetary gear set with the second member of the fourth planetary gear set;
a first torque transmitting device selectively engageable to interconnect at least one of the second member of the first planetary gear set and the input member with the first member of the fourth planetary gear set;
a second torque transmitting device selectively engageable to interconnect the third member of the third planetary gear set with the first member of the fourth planetary gear set;
a third torque transmitting device selectively engageable to interconnect the first member of the third planetary gear set with at least one of the third member of the fourth planetary gear set and the output member;
a fourth torque transmitting device selectively engageable to interconnect the third member of the second planetary gear with the stationary member; and
a fifth torque transmitting device selectively engageable to interconnect the first member of the second planetary gear set with the stationary member, and
wherein the torque transmitting devices are selectively engageable in combinations of at least three to establish at least eight forward speed ratios and at least one reverse speed ratio between the input member and the output member.

21. The transmission of claim 20 wherein the first members of the first, second and fourth planetary gear sets and the third member of the third planetary gear set are sun gears, the second members of the first, second and third planetary gear sets and third member of the fourth planetary gear set are carrier members, and the third members of the first and second planetary gear sets and the second member of the fourth planetary gear set and the first member of the third planetary gear set are ring gears.

22. The transmission of claim 20 wherein the stationary member is a transmission housing.

23. A transmission comprising:
an input member;
an output member;
first, second, third and fourth planetary gear sets each having a sun gear, a carrier member, and a ring gear, wherein the input member is continuously interconnected with the carrier member of the second planetary gear set and the output member is continuously interconnected with the carrier member of the fourth planetary gear set;
a first interconnecting member continuously interconnecting the sun gear of the first planetary gear set with the sun gear of the second planetary gear set;
a second interconnecting member continuously interconnecting the ring gear of the first planetary gear set with the sun gear of the third planetary gear set;
a third interconnecting member continuously interconnecting the ring gear of the second planetary gear set with the carrier member of the third planetary gear set;
a fourth interconnecting member continuously interconnecting the carrier member of the third planetary gear set with the ring gear of the fourth planetary gear set;
a first torque transmitting device selectively engageable to interconnect at least one of the carrier member of the second planetary gear set and the input member with at least one of the ring gear of the first planetary gear set and the sun gear of the third planetary gear set;
a second torque transmitting device selectively engageable to interconnect at least one of the sun gear of the first planetary gear set and the sun gear of the second planetary gear set with least one of the ring gear member of the first planetary gear set and the sun gear of the third planetary gear set;
a third torque transmitting device selectively engageable to interconnect the carrier member of the first planetary gear set with at least one of the carrier member of the fourth planetary gear set and the output member;
a fourth torque transmitting device selectively engageable to interconnect the ring gear of the third planetary gear with a stationary member; and
a fifth torque transmitting device selectively engageable to interconnect the sun gear of the fourth planetary gear set with the stationary member, and
wherein the torque transmitting devices are selectively engageable in combinations of at least three to establish at least eight forward speed ratios and at least one reverse speed ratio between the input member and the output member.

24. A transmission comprising:
an input member;
an output member;
first, second, third and fourth planetary gear sets each having a sun gear, a carrier member, and a ring gear, wherein the input member is continuously interconnected with the carrier member of the first planetary gear set and the output member is continuously interconnected with the carrier member of the fourth planetary gear set;
a first interconnecting member continuously interconnecting the sun gear of the first planetary gear set with the sun gear of the second planetary gear set;
a second interconnecting member continuously interconnecting the ring gear of the first planetary gear set with the sun gear of the third planetary gear set;
a third interconnecting member continuously interconnecting the carrier member of the second planetary gear set with the carrier member of the third planetary gear set;
a fourth interconnecting member continuously interconnecting the carrier member of the third planetary gear set with the ring gear member of the fourth planetary gear set;
a first torque transmitting device selectively engageable to interconnect at least one of the carrier member of the first planetary gear set and the input member with the sun gear of the fourth planetary gear set;
a second torque transmitting device selectively engageable to interconnect the sun gear of the third planetary gear set with the sun gear of the fourth planetary gear set;
a third torque transmitting device selectively engageable to interconnect the ring gear of the third planetary gear set with at least one of the carrier member of the fourth planetary gear set and the output member;
a fourth torque transmitting device selectively engageable to interconnect the ring gear of the second planetary gear with a stationary member; and
a fifth torque transmitting device selectively engageable to interconnect the sun gear of the first planetary gear set with the stationary member, and
wherein the torque transmitting devices are selectively engageable in combinations of at least three to establish at least eight forward speed ratios and at least one reverse speed ratio between the input member and the output member.

* * * * *